July 7, 1942.   I. C. GARDNER   2,288,619
ERECTING SYSTEM FOR ELBOW TELESCOPES
Filed March 25, 1941
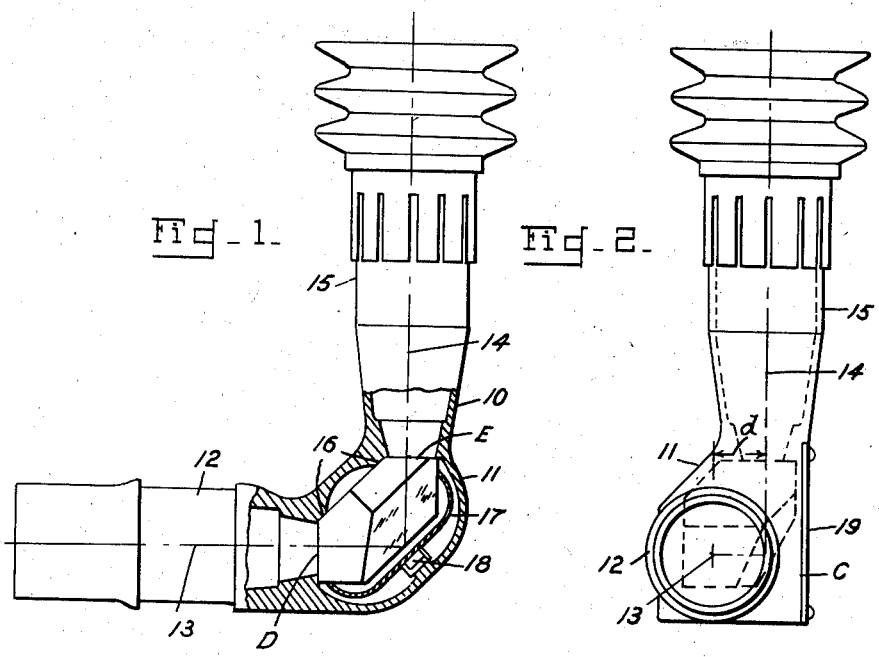
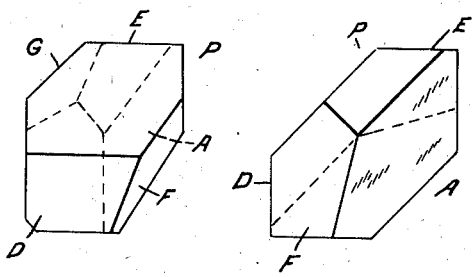
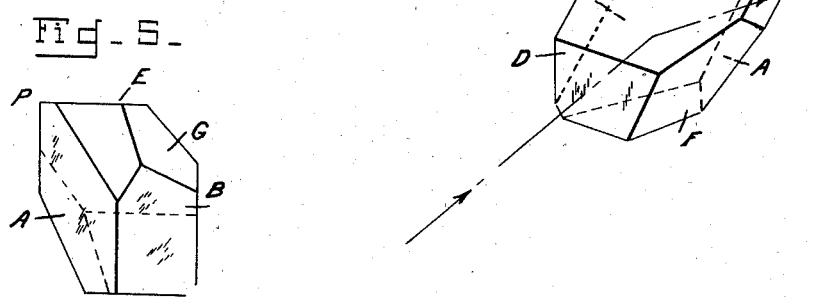
INVENTOR
Irvine C. Gardner
BY *Kessenich & Church*
ATTORNEYS Patented July 7, 1942

2,288,619

UNITED STATES PATENT OFFICE 2,288,619

ERECTING SYSTEM FOR ELBOW TELESCOPES

Irvine C. Gardner, Chevy Chase, Md.

Application March 25, 1941, Serial No. 385,114

2 Claims. (Cl. 88—33)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an image erecting system for elbow type telescopes.

In present panoramic and elbow telescopes, such for example, as those employed in fire control apparatus, erection of the image is accomplished by the inverting prism after Amici, perhaps better known by the name "roof-angle" prism owing to the semblance between a gable roof and the two reflecting surfaces of the prism which are disposed to include an angle of 90°. If the two reflecting surfaces, which may conveniently be identified as surfaces A and B, respectively, be arranged symmetrically with respect to the center of a field of view, then half of the rays forming the resultant image of a point will be incident upon and reflected by surface A and then surface B while the other half of the rays forming the resultant image point will be incident upon and reflected by surface B and then surface A. Consequently the rays incident upon surface A form an image of the point and similarly the rays incident upon surface B also form an image of the point. If the included or dihedral angle of the surfaces A and B is 90° the two images formed will be coincident resulting in a single apparent image, and utilization of this characteristic of the "roof-angle" prism for erecting the image in an elbow telescope greatly simplifies design of the telescope, however, the possibility of quantity production of the telescope is made as greatly difficult by adoption of this design of prism as the design itself is simplified by reason of the lack of technicians available capable of producing a prism of this type with a precision that will have the required accuracy. Experience has shown that the surfaces A and B must be arranged to meet on a sharp edge with no rounding permissible and that the angle between the surfaces must not differ from 90° by more than ±2 seconds if satisfactory definition is to be obtained in a telescope magnifying 3 diameters. The tolerance stated may even be less for telescopes of higher power. To make the "roof-angle" correct to within 2 seconds requires individual retouching of each prism produced. This retouching can only be done by the most skilled of optical technicians which creates at once a "bottle-neck" in quantity production during periods requiring abnormally high production owing to the accompanying and inevitable demand upon the same said technicians for other requirements of skill and the unusually few available due to the lack of demand for the same during normal production periods.

It is a principal object of the present invention to provide an image erecting system for elbow telescopes that will retain all of the advantages of the "roof-angle" prism for purposes of telescope design and obviate all of the disadvantages of the "roof-angle" prism in manufacture.

A further object of the invention is to provide an erecting system for elbow telescopes that utilizes a modified "roof-angle" prism of such design as to lend itself to quantity production by unskilled workers.

A further object of the invention is to provide an image erecting system for elbow telescopes adapted to employ a modified "roof-angle" prism wherein the reflecting sides may be arranged to have an included angle of ±2 minutes or greater.

The specific nature of the invention as well as other objects and advantages thereof will clearly appear from a description of a preferred embodiment as shown in the accompanying drawing in which:

Fig. 1 is a side elevation partially in section showing the image erecting system of the present invention in one conventional type of elbow telescope;

Fig. 2 is a front elevation of the telescope shown in Fig. 1;

Figs. 3, 4 and 5 are front, side and rear views of the modified "roof-angle" prism of the present invention employed in the telescope of Figs. 1 and 2, and Fig. 6 is a perspective view of the prism shown in Figs. 3, 4 and 5 and disclosing the light path through the prism.

Referring now to the drawing, there is shown in Figs. 1 and 2 an elbow telescope generally indicated at 10 which comprises an elbow body 11 having an entrance end portion or branch 12 provided with an axis 13 disposed at an angle with respect to the axis 14 of the exit end portion or branch 15 thereof and contained in a plane laterally displaced a suitable distance $d$ relative to a parallel plane containing the axis 14 as more clearly shown in Fig. 2.

A modified "roof-angle" prism P having reflecting faces A and B is mounted in the elbow portion of the body 11 through a suitable opening in one side thereof with its face C, opposed to the sides A, B, seated against supporting projections 16 preferably formed integral with the elbow adjacent its smaller radius. The prism P is also positioned within the elbow with its entrance and exit faces D and E, respectively, centered with regard to the corresponding axes 13 and 14 whereby the reflecting face B is centered relative to axis 13 and reflecting face A is centered with respect to axis 14, and is held in this position by a holder 17 and wedge 18 as indicated in Fig. 1. The opening in the side of the elbow is closed by a moisture and dust-proof cover 19 as clearly shown in Fig. 2.

As well understood by those versed in the art, the telescope is completed by the usual objective and eyepiece assemblies which have been omitted from the instant disclosure for the sake of simplicity since they form no part of the present invention.

By the arrangement above proposed it is obvious that prism P resembles the conventional roof prism with faces A and B arranged in the same order. However, because of the offset $d$ of axes 13 and 14 and depending upon whether the sense of offset $d$ is right or left, as viewed in Fig. 2, either face A or B will receive and reflect all incident light to face B or A, respectively, and all reflections will be in the same order. In other words, light path A to B or B to A alone exists in the system herein disclosed and not both light paths as in the conventional system. Since all light is incident upon face A or B it follows that these faces are made substantially twice as large as the corresponding faces in the conventional "roof-angle" prism to maintain the same illumination.

As the arrangement of the present invention eliminates the necessity of obtaining coincidence of two images formed by two separate light paths, as in the case of the conventional "roof-angle" prism, it is found that the included angle between the reflecting faces A and B can deviate from 90° as much as ±2 minutes or more without detrimentally affecting the definition and that the new type of prism can be made with no greater difficulty than accompanies the construction of the Porro prism for a binocular.

The prism housing formed by the elbow of the telescope must be made larger to accommodate the relatively larger prism of this invention as well as providing an offset between the two branches of the elbow, but the increased size of the housing and the offset are factors of such small consequence as compared to the external diameter of the telescope that the functional performance of the latter is totally unaffected.

To reduce the weight of the prism to a convenient minimum the prism is formed with oblique surfaces F and G at a pair of diagonally opposed corners, as the glass outside of these surfaces, which is found in the conventional roof prism, is inactive in the present prism and may be omitted to reduce weight, decrease cost, and generally facilitate production.

To still further decrease weight the faces D and E of prism P may be made of circular form corresponding in diameter to the entrance aperture of the telescope and the reflecting surfaces A and B may be made of elliptical form corresponding to the projections of faces D and E thereon respectively. The circular and elliptical faces mentioned may be joined by minimum surfaces permitting full reflection of the incident light and the weight thereby reduced to an absolute minimum.

The prism P may be conveniently cast in a mold and only the active faces, such as the circular entrance and exit faces D and E respectively, and elliptical faces defining surfaces A and B as above described polished.

Having now described a present preferred embodiment of the invention, I claim:

1. In an elbow type telescope in combination, an elbow body having an entrance branch and emergent branch, said branches having the axes thereof offset laterally with respect to each other, an erecting prism disposed within said elbow said prism consisting of two reflecting surfaces arranged to include an angle of substantially 90° therebetween and having the center of one of its reflecting surfaces coinciding with the center of the field of view of the entrance branch of the elbow and the center of the other reflecting surcoinciding with the center of the emergent branch of the elbow.

2. In an elbow type telescope in combination, an elbow body having an entrance branch and emergent branch, said branches having the axes thereof offset laterally with respect to each other, an erecting prism disposed within said elbow, said prism consisting of two reflecting surfaces relatively disposed to include an angle of 90° ±2 minutes, said prism also being arranged within the elbow to have the median line of one of its reflecting surfaces intersecting the axis of the entrance branch of said elbow body and the median line of the other reflecting surface intersecting the axis of the emergent branch of the elbow.

IRVINE C. GARDNER.